United States Patent
Wu

(10) Patent No.: US 9,749,196 B2
(45) Date of Patent: Aug. 29, 2017

(54) METHOD AND DEVICE FOR CONFERENCE RESERVATION

(71) Applicant: ZTE Corporation, Shenzhen, Guangdong (CN)

(72) Inventor: Yongming Wu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 191 days.

(21) Appl. No.: 14/419,522

(22) PCT Filed: Jul. 26, 2013

(86) PCT No.: PCT/CN2013/080218
§ 371 (c)(1),
(2) Date: Feb. 4, 2015

(87) PCT Pub. No.: WO2014/026536
PCT Pub. Date: Feb. 20, 2014

(65) Prior Publication Data
US 2015/0215175 A1    Jul. 30, 2015

(30) Foreign Application Priority Data
Aug. 17, 2012  (CN) .......................... 2012 1 0295713

(51) Int. Cl.
*G06F 15/173* (2006.01)
*H04L 12/24* (2006.01)
(Continued)

(52) U.S. Cl.
CPC ......... *H04L 41/5054* (2013.01); *G06Q 10/02* (2013.01); *G06Q 10/06* (2013.01); *G06Q 10/10* (2013.01); *H04N 7/152* (2013.01)

(58) Field of Classification Search
USPC .................. 709/226, 204; 370/260; 348/700
See application file for complete search history.

(56) References Cited

U.S. PATENT DOCUMENTS 8,126,992 B2 *  2/2012  Andreev ............... G06Q 10/06
                                                       370/260
2004/0103147 A1 *  5/2004  Flesher .............. G06F 17/30575
                                                       709/204
(Continued)

FOREIGN PATENT DOCUMENTS

CN          1735191 A       2/2006
CN          1983316 A       6/2007
(Continued)

OTHER PUBLICATIONS

International Search Report in international application No. PCT/CN2013/080218, mailed on Oct. 31, 2013.
(Continued)

*Primary Examiner* — Tammy Nguyen
(74) *Attorney, Agent, or Firm* — Oppedahl Patent Law Firm LLC

(57) ABSTRACT

Disclosed are a method and a device for conference reservation, wherein the method includes: the conference time information and the position selection range information are matched with pre-stored conference resource information; if the matching succeeds, the conference is successfully reserved; if the matching fails, the conference is not successfully reserved; wherein the conference resource information includes idle or occupied status information based on a time axis for all terminals and resource consumption status information based on the time axis for a Multipoint Control Unit (MCU). The method and device according to the present disclosure can improve apparently the success rate of conference reservation, and can improve the utilization of equipment resources, thereby leading to an improvement on productivity.

8 Claims, 3 Drawing Sheets

(51) Int. Cl.
    *G06Q 10/02*     (2012.01)
    *G06Q 10/06*     (2012.01)
    *G06Q 10/10*     (2012.01)
    *H04N 7/15*     (2006.01)

(56) References Cited

U.S. PATENT DOCUMENTS

| | | | |
|---|---|---|---|
| 2005/0071213 | A1 | 3/2005 | Kumhyr |
| 2007/0294344 | A1* | 12/2007 | Mohan ................ G06Q 10/109 709/204 |
| 2009/0112671 | A1* | 4/2009 | Grodum ................ G06F 19/327 705/7.19 |
| 2010/0118205 | A1* | 5/2010 | Sohma ................ G06T 7/248 348/700 |
| 2010/0250315 | A1 | 9/2010 | Landau |
| 2010/0289867 | A1* | 11/2010 | Nimri ................ H04M 3/42348 348/14.08 |
| 2016/0261655 | A1* | 9/2016 | Aggarwal ........... H04L 65/4053 |

FOREIGN PATENT DOCUMENTS

| | | |
|---|---|---|
| CN | 101193262 A | 6/2008 |
| CN | 101710962 A | 5/2010 |

OTHER PUBLICATIONS

English Translation of the Written Opinion of the International Search Authority in international application No. PCT/CN2013/080218, mailed on Oct. 31, 2013.
Supplementary European Search Report in European application No. 13829198.4, mailed on Jul. 3, 2015.

* cited by examiner

METHOD AND DEVICE FOR CONFERENCE RESERVATION

TECHNICAL FIELD

The present disclosure relates to the technical field of multi-media conference, and in particular to a method and a device for conference reservation.

BACKGROUND

A multimedia conferencing system is a remote communication system that supports bidirectional transmission of voices and videos. By means of such a system, users located at different positions can implement real-time voice and video communications having an effect which is similar to that obtained in face-to-face communications.

Standard organizations such as the International Telecommunication Unit (ITU), Internet Engineering Task Force (IETF) and 3rd Generation Partnership Project (3GPP) are in charge of formulating video conferencing standards. ITU has formulated several video communication standards such as ITU-T H.320, ITU-T H.323 and ITU-T H.324, in which ITU-T H.320 is for multimedia communication applications of narrow-band circuit-switched networks, ITU-T H.323 is for multimedia communication applications of IP networks, and ITU-T H.324 is for multi-media communication applications of very low-rate networks such as a Public Switched Telephone Network (PSTN) and mobile network. IETF is in charge of formulating the Session Initialization Protocol (SIP) and a multimedia conferencing standard based on the protocol. 3GPP is in charge of formulating standards of an IP Multimedia Subsystem (IMS), and also formulated an IMS-based multimedia conferencing standard on the basis of the IETF standard. Besides the aforementioned organizations, other organizations contributed directly or indirectly to standards of video conferencing. To meet needs of product design and development, some enterprises formulate proprietary products and communication specifications that are for internal use, or make proprietary extensions on integration of developed standards. Video conferencing products can comply with one or more open standards or enterprise proprietary standards.

Divided by inter-operating interfaces of equipments, a video conferencing system typically consists of entities or devices such as a terminal, a Multipoint Control Unit (MCU), a gateway and a call controller.

The terminal is an equipment used by a user, and one system typically includes multiple terminals. The terminal typically consists of a core codec and external input/output devices. The codec is in charge of pre-processing, encoding, decoding, post-processing of voice and video signals, network communication and user control and other processing. The input devices include devices such as microphone and camera, and output devices include devices such as sound system and TV. The terminal collects user's voice and video signals, performs compressed encoding on the signals after pre-processing them, and then encapsulates encoded signals into data packets which are transmitted to far ends by networks; and the terminal receives data packets from the far ends through the networks, decodes valid data obtained from de-capsulation, and plays post-processed decoded data for the user.

The MCU is used to implement multi-party conferencing communication. When a multipoint conference is held, a many-to-one connection is established between multiple terminals joining in the multi-party conferencing communication and the MCU, and the terminals switches audio/video signals through the MCU. The MCU is in charge of implementing switching and mixing of media streams. For voice media streams, the MCU outputs a sound-mixed voice media stream for each terminal, and the sound-mixing is performed by superposing several voice media streams having a largest input volume. For videos, the MCU may transmit to a certain terminal a single-frame video stream of another terminal, and if the MCU support a multi-frame function, the MCU may also mix videos of multiple terminals into a multi-frame image and then transmit the multi-frame image to one or more terminals.

The call controller is used to select a route of a call, for example, a Gatekeeper entity defined in the H.323 standard and a Proxy entity defined in the SIP standard are in charge of implementing a call routing functionality.

Gateway devices are used to implement switching between devices of different network protocols and media formats for the purpose of intercommunications.

Information content switched between video conferencing devices includes call control instructions and one or more audio streams, video streams and textual message streams. For meanings of various media streams, encoding/decoding of media streams and management of their transmission, please refer to related standards specified in ITU-T H.323 and related standards specified in IETF SIP.

In practical applications within an enterprise, the video conferencing system is usually a kind of rare resources, thus it should be managed through reservations. A conference reservation is constrained by two aspects, including time and resources. For example a person who reserves a conference wants the multi-party video conference to be held during 9:00-11:00 a next morning with terminals and conference rooms involved in the conference located respectively in conference room 101 (terminal 1001 included) of Shenzhen Headquarter, conference room 201 (terminal 2001 included) of Beijing Branch and conference room 301 (terminal 3001 included) of Nanjing Branch Office. Since multiple parties are involved, thus MCU equipment resources typically need to be occupied. If both terminals and MCU resources are idle in this period of time, the conference reservation system will reserve these resources for the conference and return a result of reservation success. When other user desires to reserve a conference during a same period of time and plans to occupy conference room 101, the reservation system will return a result of reservation failure since conference room 101 is already occupied.

In an existing conference reservation system, a user is typically required to input a start time of a conference, an end time of the conference and a list of terminals desired to join in the conference, and the system calculates a reservation result according to parameters input by the user and occupation conditions of system resources. When the system includes too many terminals and conference services are too busy, the above processing way has apparent disadvantages. One or more terminals specified by a user in a list are likely to be occupied in a specified period of time, a reservation failure is thus generated; the user needs to attempt continually to select different terminals or select different periods of time, thus existing reservation techniques have a disadvantage that conference reservation is inconvenient.

SUMMARY

Embodiments of the present disclosure are intended to provide a conference reservation method and device so as to solve a problem that it is not convenient to reserve a conference in the prior art.

In order to solve the above problem, according to one aspect, embodiments of the present disclosure provide a conference reservation method including:

conference time information of a conference and position selection range information of one or more terminals joining in the conference are acquired;

the conference time information and the position selection range information are matched with pre-stored conference resource information; if the matching succeeds, the conference is successfully reserved; if the matching fails, the conference is not successfully reserved; wherein the conference resource information includes idle or occupied status information based on a time axis for all terminals and resource consumption status information based on the time axis for a Multipoint Control Unit (MCU).

Preferably, the conference time information may include a conference duration and an acceptable conferencing time interval.

Preferably, the matching may include: it is determined, among the conference resource information, whether there is a time window whose duration is equal to the conference duration within the acceptable conferencing time interval, within which time window there is at least one idle terminal in each position range according to the position selection range information of the terminal(s) and within which time window there are available MCU resources; if there is the time window, it is indicated that the matching succeeds, otherwise, it is indicated that the matching fails.

Preferably, the time window may be determined by the following ways:

a starting of the conferencing time interval is selected as a starting of a first candidate for the time window and the conference duration is selected as a duration of the first candidate for the time window; it is determined whether the first candidate for the time window is successfully matched, if Yes, the first candidate for the time window is regarded as the time window, if No, the starting of the first candidate for the time window is delayed for an increment and it is re-determined whether it is successfully matched; and the delaying and re-determining are repeated until it is successfully matched or all conferencing time intervals are traversed completely.

Preferably, the method may further include: when the conference is ended, statuses of terminals joining in the conference and statuses of the MCU are modified to an idle status and saved.

According to another aspect, embodiments of the present disclosure further provide a conference reservation device including:

an input unit configured to acquire conference time information of a conference and position selection range information of one or more terminals joining in the conference;

a reservation unit configured to match the conference time information and the position selection range information with pre-stored conference resource information; if the matching succeeds, the conference is successfully reserved; if the matching fails, the conference is not successfully reserved; wherein the conference resource information comprises idle or occupied status information based on a time axis for all terminals and resource consumption status information based on the time axis for a Multipoint Control Unit (MCU).

Preferably, the conference time information may include a conference duration and an acceptable conferencing time interval.

Preferably, the reservation unit may be further configured to determine, among the conference resource information, whether there is a time window whose duration is equal to the conference duration within the acceptable conferencing time interval, within which time window there is at least one idle terminal in each position range according to the position selection range information of the terminal(s) and within which time window there are available MCU resources; if there is the time window, it is indicated that the matching succeeds, otherwise, it is indicated that the matching fails.

Preferably, the reservation unit may be further configured to select a starting of the conferencing time interval as a starting of a first candidate for the time window and select the conference duration as a duration of the first candidate for the time window; determine whether the first candidate for the time window is successfully matched, if Yes, regard the first candidate for the time window as the time window, if No, delay, for an increment, the starting of the first candidate for the time window and re-determine whether it is successfully matched; and repeat the delaying and re-determining until it is successfully matched or all conferencing time intervals are traversed completely.

Preferably, the reservation unit may be further configured to, when the conference is ended, modify statuses of terminals joining in the conference and statuses of the MCU to an idle status and save the idle status.

Beneficial effects of embodiments the present disclosure are as follows.

The method and device according to embodiments of the present disclosure can improve apparently the success rate of conference reservation, and can improve the utilization of equipment resources, thereby leading to an improvement on productivity.

DETAILED DESCRIPTION

In order to solve the problem that conference reservation is not convenient in the prior art, the present disclosure provides a conference reservation method and device, and the present disclosure will be further elaborated below in combination with accompanying drawings and embodiments. It should be understood that the specific embodiments are only used to interpret the present disclosure instead of limiting the present disclosure.

In fact, when there are multiple conference rooms in a certain place such as a building, a user does not care about which conference room is to be used, and one unoccupied conference room can be selected therefrom arbitrarily by a system. By using such a rule, the success rate of conference reservation can be improved effectively. On the other hand, in certain cases, the user may not care about a time interval during which a conference is held, for example it is acceptable for the user whether the conference is to be held during 9:00-11:00 or during 10:00-12:00.

Figure 1:
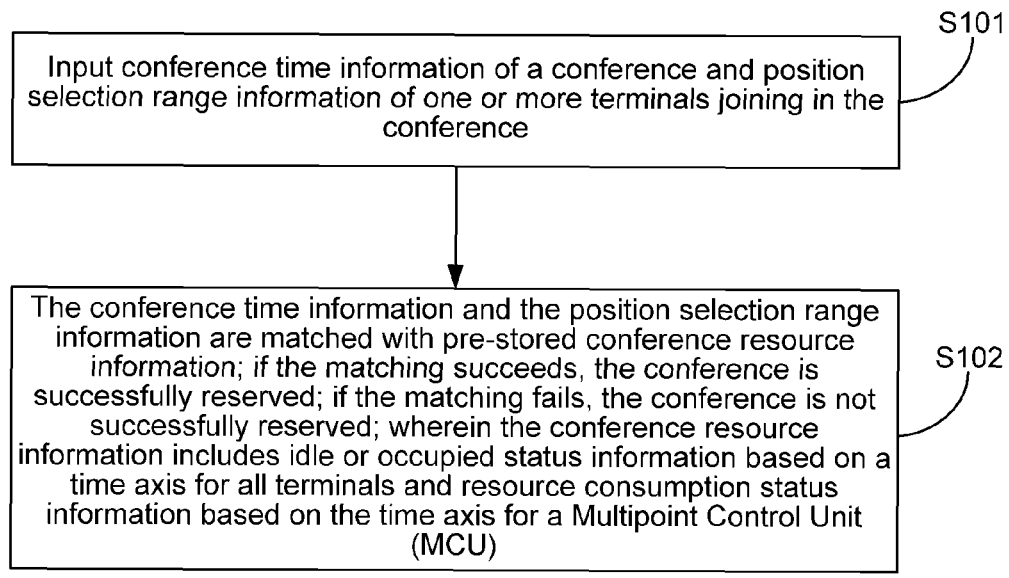
FIG. 1 is a flow chart of a conference reservation method according to an embodiment of the present disclosure.

As shown in FIG. 1, embodiments of the present disclosure relate to a conference reservation method, and the method includes:

step S101, conference time information of a conference and position selection range information of one or more terminals joining in the conference are acquired;

In the step, before being acquired, the conference resource information is firstly stored and maintained (updated); the conference resource information includes but is not limited to description information of terminal resources and description information of MCU resources. The description information of terminal resources includes but is not limited to terminal's ID, hierarchical position information, and idle or occupied status based on a time axis. One of representation ways of terminal's hierarchical position information is to express it using physical positions, the position information includes a subordination relation between the physical positions, for example one hierarchical expression of physical positions is: state-city-building-floor-conference room. One of representation ways of terminal's hierarchical position information is to express it using logical positions, the position information includes a subordination relation between the logical positions, for example one hierarchical expression of logical positions is: headquarter (division)-department—conference room. The description information of MCU resources includes but is not limited to one or more of: port capacity and consumption, interface bandwidth capacity and consumption, total volume and consumption of audio media processing resources, and total volume and consumption of video media processing resources.

The conference time information includes a conference duration and an acceptable conferencing time interval. The position selection range information of terminals joining in the conference is one hierarchy of the hierarchical position information.

Step S102, the conference time information and the position selection range information are matched with pre-stored conference resource information; if the matching succeeds, the conference is successfully reserved; if the matching fails, the conference is not successfully reserved; wherein the conference resource information includes idle or occupied status information based on a time axis for all terminals and resource consumption status information based on the time axis for a Multipoint Control Unit (MCU).

In the step, it is determined, among the conference resource information, whether there is a time window whose duration is equal to the acceptable conference duration within the acceptable conferencing time interval, within which time window there is at least one idle terminal in each position range according to the position selection range information of the terminal(s) and within which time window there are available MCU resources; if there is the time window, it is indicated that the matching succeeds, otherwise, it is indicated that the matching fails. Available MCU resources refer to MCU resources existing in a time window, which can meet requirements of a conference to be reserved and ensure the conference to be held on schedule. For example, the conference to be reserved needs 3 ports and a bandwidth capacity of 3M and a number of remaining ports is above 3 and remaining bandwidth capacity is above 3M, the it is considered that there are available MCU resources. Certainly, for example other necessary MCU resources such as CPU resources also need to meet requirements of the conference to be reserved, and those skilled in the art appreciate apparently what are necessary resources for a conference to be reserved successfully, therefore the detailed description thereof will be omitted in the embodiment.

The time window is determined by the following ways: a starting of the conferencing time interval is selected as a starting of a first candidate for the time window and the conference duration is selected as a duration of the first candidate for the time window; it is determined whether the first candidate for the time window is successfully matched, if Yes, the first candidate for the time window is regarded as the time window, if No, the starting of the first candidate for the time window is delayed for an increment and it is re-determined whether it is successfully matched; and the delaying and re-determining are repeated until it is successfully matched or all conferencing time intervals are traversed completely.

Regardless of whether the reservation is successful or not, a result is returned to the person making the reservation, and the result is a success indication or a failure indication and optional parameters; if the reservation is successful, the optional parameters include and are not limited to information of a retained conference room and conference room information; the information of the retained conference room includes but is not limited to one or more of: conference room ID, position information and call address; the conference information includes and is not limited to conference subject, conference start time, conference duration and call address.

when the conference is ended, statuses of terminals joining in the conference and statuses of the MCU are modified to an idle status and saved.

Figure 2:
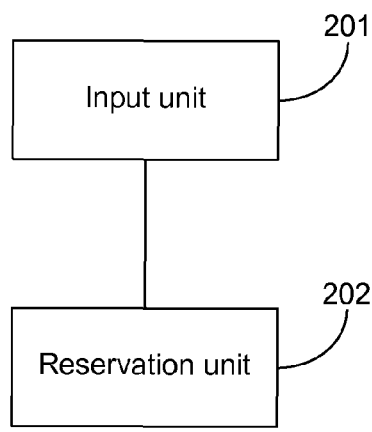
FIG. 2 is a schematic structural diagram of a conference reservation device according to an embodiment of the present disclosure.

As shown in FIG. 2, embodiments of the present disclosure relate to a conference reservation device for implementing the above method, and the device includes:

an input unit 201 configured to acquire conference time information of a conference and position selection range information of one or more terminals joining in the conference;

a reservation unit 202 configured to match the conference time information and the position selection range information with pre-stored conference resource information; if the matching succeeds, the conference is successfully reserved; if the matching fails, the conference is not successfully reserved; wherein the conference resource information comprises idle or occupied status information based on a time axis for all terminals and resource consumption status information based on the time axis for a Multipoint Control Unit (MCU).

Specifically, the conference time information includes a conference duration and an acceptable conferencing time interval.

The reservation unit 202 is further configured to determine, among the conference resource information, whether there is a time window whose duration is equal to the conference duration within the acceptable conferencing time interval, within which time window there is at least one idle terminal in each position range according to the position selection range information of the terminal(s) and within which time window there are available MCU resources; if there is the time window, it is indicated that the matching succeeds, otherwise, it is indicated that the matching fails. A starting of the conferencing time interval is selected as a starting of a first candidate for the time window and the conference duration is selected as a duration of the first candidate for the time window; it is determined whether the first candidate for the time window is successfully matched, if Yes, the first candidate for the time window is regarded as the time window, if No, the starting of the first candidate for the time window is delayed for an increment and it is re-determined whether it is successfully matched; and the delaying and re-determining are repeated until it is successfully matched or all conferencing time interval are traversed completely. when the conference is ended, statuses of terminals joining in the conference and statuses of the MCU are modified to an idle status and saved.

The present disclosure will be elaborated below with reference to a specific embodiment.

Figure 3:
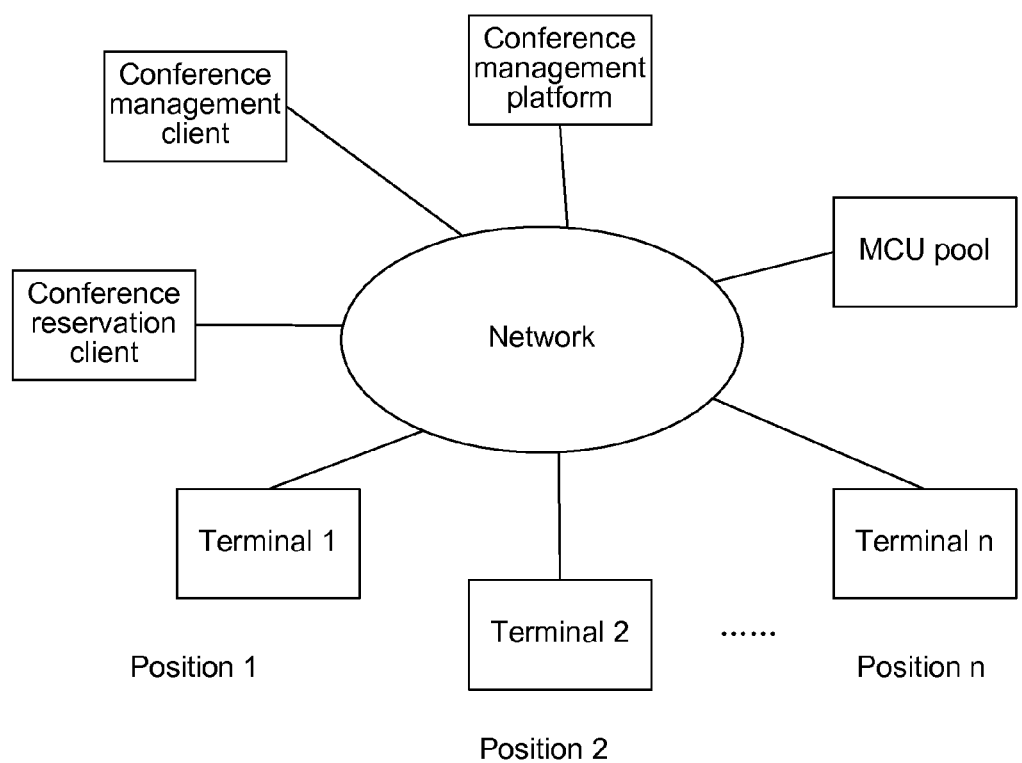
FIG. 3 is a schematic structural diagram of a video conference system according to an embodiment of the present disclosure.

FIG. 3 is a schematic structural diagram of a video conference system that supports a method according to an embodiment of the present disclosure, for the sake of clarity, supporting equipments the omission of which will not affect description of the embodiment such as a call server, gateway and the like are omitted in FIG. 3; such supporting equipments are connected according to the prior art. Various equipments communicate with each other through a network, the network in FIG. 3 may represent multiple types of networks, for example, an H.323 video conferencing equipment communicates through an IP network, and if it is compatible to H.320, it communicates through a circuit-switched network. A video conference management platform (reservation unit) is used to implement functions including conference reservation, conference control, equipment management, user management, malfunction management and performance management. A conference management client (input unit) is used to provide an operation interface to an administrator, and the administrator, through the conference management client, types into the conference management platform related description information of conference resources and description information of terminal resources, such as terminal ID, position information, call address and the like; description information of MCU resources includes for example port capacity, interface bandwidth, quantity of resources processed by audio media, quantity of resources processed by video media and the like. In addition, the conference management platform may also collect resource description information by reporting the resource description information through a terminal and an MCU. A conference reservation client (input unit) is used to provide an operation interface to a conference reservation user, and the conference reservation user, through the conference reservation client, inputs into the conference management platform conference reservation information that includes parameters such as conference duration, acceptable conferencing time interval, position range of terminals joining the conference and the like.

Figure 4:
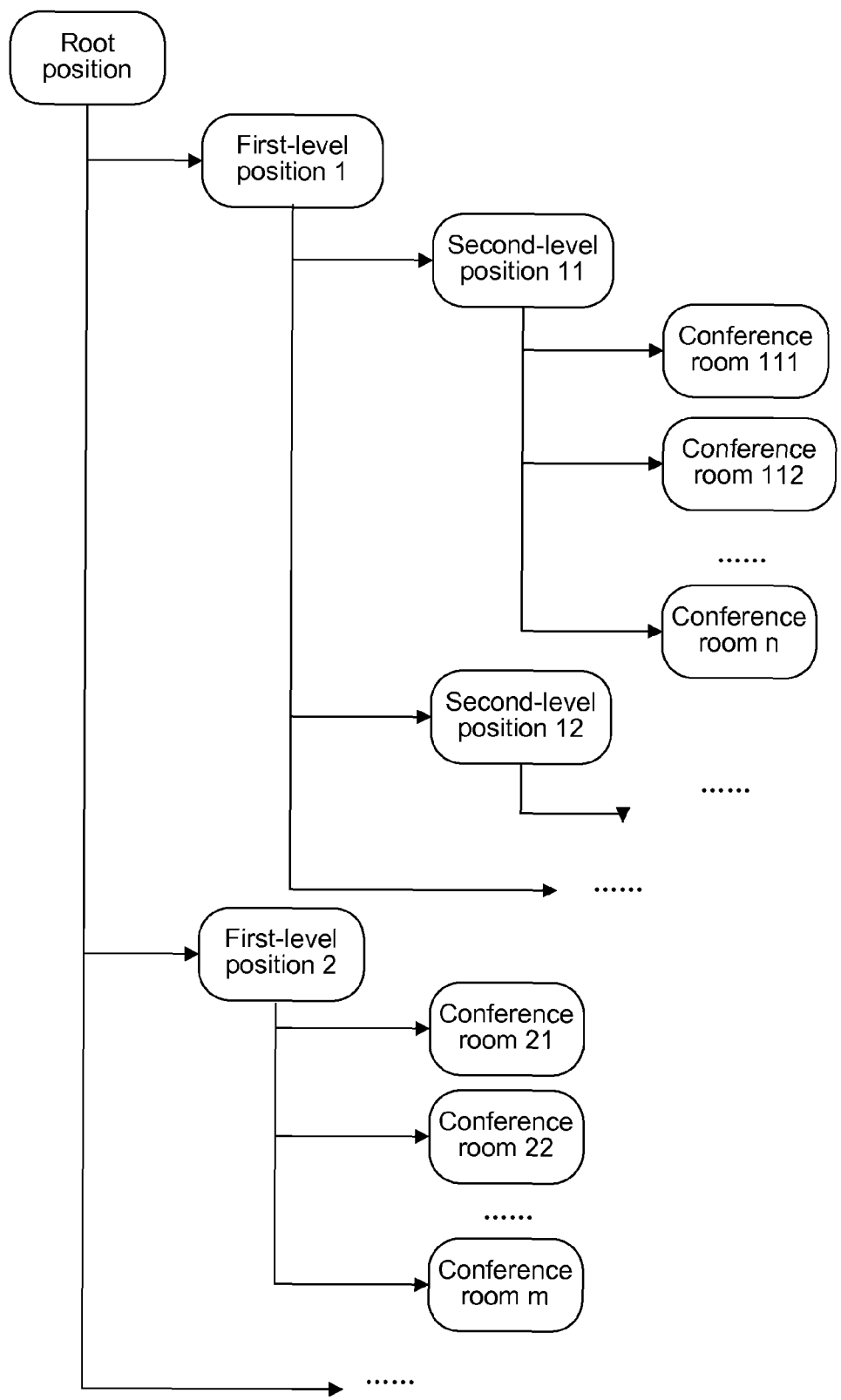
FIG. 4 is a schematic diagram showing a way in which position information of terminals are organized according to an embodiment of the present disclosure.

FIG. 4 is a schematic diagram showing a way in which position information of terminals are organized, and the terminal positions are organized into a tree-like hierarchical structure. For the sake of convenience in expression, FIG. 4 only shows relations between first-level positions, second-level positions and conference rooms, and other level of positions can be used in practical implementation. A root node can represent a conference reservation system, the first-level and second-level positions are medium hierarchies, and the conference rooms are a last-level hierarchy. A complete position of a terminal is determined collectively by all medium hierarchies and last-level hierarchy, for example <first-level position 1, second-level position 11, conference room 112>. In one specific example using above structure, a first-level position represents a state name, a second-level position represents a city name, a third-level position represents a building name, a fourth-level position represents a floor name, and the last-level is a conference room.

The procedures for performing conference reservation using the above system include:

step 1, conference resource description information is initialized, and this process is typically performed in a phase when the system is initialized. For example, typed into the system by an administrator through a conference management client; resources are newly added or deleted during the use of the system. The resource description information can be stored in a database, for example terminal description information can be described by table 11 and table 12, wherein table 11 is used to store basic information of all terminals, and table 12 represents occupied statuses of terminals during different periods of time.

TABLE 11

| Terminal ID | Position | ... |
|---|---|---|
| | | |
| | | |
| | | |

TABLE 12

| Terminal ID | Start time | End time |
|---|---|---|
| | | |
| | | |
| | | |

The description of MCU resources can be done by table 21 and table 22; table 21 is used to represent capacities of all MCU resources, and table 22 represents occupied statuses of an MCU during different periods of time.

TABLE 21

| MCU ID | Port Quantity | Bandwidth Capacity | Audio media processing quantity | Video media processing quantity | ... |
|---|---|---|---|---|---|
| | | | | | |
| | | | | | |
| | | | | | |

TABLE 22

| MCU ID | Quantity of occupied ports | Bandwith consumption | Audio media processing consumption | Video media processing consumption | Start time | End time | ... |
|---|---|---|---|---|---|---|---|
| | | | | | | | |
| | | | | | | | |
| | | | | | | | |

In order to facilitate recycling of conference resources, conference-related tables such as table 31, table 32, table 33<conference ID, , , , , , . . . > are established for a conference; table 31 is used to represent basic information of the conference, table 32 represents terminal resources occupied by the conference, and table 33 represents MCU resources occupied by the meeting.

TABLE 31

| Conference ID | Start time | End time | ... |
|---|---|---|---|
|  |  |  |  |
|  |  |  |  |
|  |  |  |  |

TABLE 32

| Conference ID | Terminal ID | ... |
|---|---|---|
|  |  |  |
|  |  |  |
|  |  |  |

TABLE 33

| Conference ID | MCU ID | Port consumption | Bandwidth consumption | Audio media consumption | Audio resources consumption | ... |
|---|---|---|---|---|---|---|
|  |  |  |  |  |  |  |
|  |  |  |  |  |  |  |
|  |  |  |  |  |  |  |

Step 2, a conference reservation user performs conference reservation through a reservation client, the reservation user inputs information, such as a conference subject, site ranges of multiple terminals joining the conference, conference duration, acceptable conferencing time intervals and the like, and submits input information to the conference management platform for calculation. Referring to the description of FIG. 3, site ranges of terminals can be selected from positions of any level, for example, when a building is selected, any terminal in the range of the building can be selected as a candidate for a terminal joining the conference.

Step 3, the conference management platform retains conference resources. The conference management platform deduces, according to parameters input by the reservation user and description information of current conference resources, whether the conference can be successfully reserved. The deduction method includes determining whether there is a time window whose duration is equal to a conference duration requested by the reservation user within an acceptable conferencing time interval, within which time window there is at least one idle terminal in each position range submitted by the reservation user and within which time window there are available MCU resources. If there is such a time window, it is indicated that the conference is successfully reserved, otherwise, the conference cannot be reserved. If the conference is successfully reserved, a terminal resource description table 12, a MCU resource description table 22, conference tables 32 and 33 are respectively updated so as to indicate occupancy of terminal resources and MCU resources. One method for determining the time window is using a cyclic search, i.e., a starting of the conferencing time interval that is acceptable for the reservation user is selected as a starting of a first candidate for the time window, it is checked whether the first candidate for the time window can pass the aforementioned deduction, if No, the starting of the first candidate for the time window is delayed for an increment for example 5 minutes, then the checking and delaying are repeated until a proper time window is found or all conferencing time intervals that are acceptable for the reservation user are traversed completely.

Step 4, the conference management platform returns a reservation result to the reservation client, if the reservation is successful, the result may carry related information of the conference, such as conference subject, conference start time, conference duration, conference end time, IDs of retained terminals and terminal positions. If the reservation is not successful, causes for the failure can be carried.

Step 5, after the conference is ended, the conference management platform releases resources occupied by the conference. Specifically, the terminal resource description table 12, the MCU resource description table 22, the conference tables 32 and 33 are updated so as to indicate release of terminal resources and MCU resources.

In the description of embodiments of the present disclosure, some unimportant detailed information and optimized steps are omitted. For example, if there are multiple time windows that meet requirements during the reservation, the reservation user may be provided with an opportunity for selecting one time window therefrom; if there are multiple terminals that meet requirements within one position range, the reservation user may also be provided with an opportunity for selecting one terminal therefrom. Similar optimization measures should be considered to be within the scope of protection of the present disclosure.

It can be seen from above embodiments that the method and device according to the present disclosure can improve apparently the success rate of conference reservation, and can improve the utilization of equipment resources, thereby leading to an improvement on productivity.

Although preferred embodiments of the present disclosure are disclosed for purpose of illustration, it should be realized by those skilled in the art that various modifications, additions and substitutions are possible, thus the scope of protection of the present disclosure should not be limited to the above embodiments.

INDUSTRIAL APPLICABILITY

Provided are a conference reservation method and device, wherein the method includes: the conference time information and the position selection range information are matched with pre-stored conference resource information; if the matching succeeds, the conference is successfully reserved; if the matching fails, the conference is not successfully reserved; wherein the conference resource information includes idle or occupied status information based on a time axis for all terminals and resource consumption status information based on the time axis for a Multipoint Control Unit (MCU). The method and device according to the present disclosure can improve apparently the success rate of conference reservation, and can improve the utilization of equipment resources, thereby leading to an improvement on productivity.

The invention claimed is:

1. A method for conference reservation, comprising:
   acquiring conference time information of a conference and position selection range information of one or more terminals joining in the conference;
   matching the conference time information and the position selection range information with pre-stored conference resource information; if the matching succeeds, the conference is successfully reserved; if the matching fails, the conference is not successfully reserved;
   wherein the conference resource information comprises idle or occupied status information based on a time axis for all terminals, and resource consumption status information based on the time axis for a Multipoint Control Unit (MCU);
   wherein the conference time information comprises a conference duration and a conferencing time interval;
   and wherein the matching comprises: determining, among the conference resource information, whether there is a time window whose duration is equal to the conference duration within the conferencing time interval, within which time window there is at least one idle terminal in each position range according to the position selection range information of the terminal(s) and within which time window there are available MCU resources; if there is the time window, it is indicated that the matching succeeds, otherwise, it is indicated that the matching fails.

2. The method according to claim 1, wherein the time window is determined by:
   selecting a starting of the conferencing time interval as a starting of a first candidate for the time window and selecting the conference duration as a duration of the first candidate for the time window; determining whether the first candidate for the time window is successfully matched, if Yes, regarding the first candidate for the time window as the time window, if No, delaying, for an increment, the starting of the first candidate for the time window and re-determining whether it is successfully matched; and repeating the delaying and re-determining until it is successfully matched or all conferencing time intervals are traversed completely.

3. The method according to claim 1, further comprising:
   when the conference is ended, modifying statuses of terminals joining in the conference and statuses of the MCU to an idle status and saving the idle status.

4. The method according to claim 2, further comprising:
   when the conference is ended, modifying statuses of terminals joining in the conference and statuses of the MCU to an idle status and saving the idle status.

5. A conference reservation device, comprising:
   an input unit configured to acquire conference time information of a conference and position selection range information of one or more terminals joining in the conference;
   a reservation unit configured to match the conference time information and the position selection range information with pre-stored conference resource information; if the matching succeeds, the conference is successfully reserved; if the matching fails, the conference is not successfully reserved; wherein the conference resource information comprises idle or occupied status information based on a time axis for all terminals, and resource consumption status information based on the time axis for a Multipoint Control Unit (MCU);
   wherein the conference time information comprises a conference duration and a conferencing time interval;
   wherein the reservation unit is configured to determine, among the conference resource information, whether there is a time window whose duration is equal to the conference duration within the conferencing time interval, within which time window there is at least one idle terminal in each position range according to the position selection range information of the terminal(s) and within which time window there are available MCU resources; if there is the time window, it is indicated that the matching succeeds, otherwise, it is indicated that the matching fails.

6. The device according to claim 5, wherein the reservation unit is configured to select a starting of the conferencing time interval as a starting of a first candidate for the time window and select the conference duration as a duration of the first candidate for the time window; determine whether the first candidate for the time window is successfully matched, if Yes, regard the first candidate for the time window as the time window, if No, delay, for an increment, the starting of the first candidate for the time window and re-determine whether it is successfully matched; and repeat the delaying and re-determining until it is successfully matched or all conferencing time intervals are traversed completely.

7. The device according to claim 5, wherein the reservation unit is configured to, when the conference is ended, modify statuses of terminals joining in the conference and statuses of the MCU to an idle status and save the idle status.

8. The device according to claim 6, wherein the reservation unit is configured to, when the conference is ended, modify statuses of terminals joining in the conference and statuses of the MCU to an idle status and save the idle status.

* * * * *